US012073707B2

(12) United States Patent
Reimer et al.

(10) Patent No.: US 12,073,707 B2
(45) Date of Patent: Aug. 27, 2024

(54) CUSTOMER EXPERIENCE DIAGNOSTICS IN PREMISES MONITORING SYSTEMS

(71) Applicant: The ADT Security Corporation, Boca Raton, FL (US)

(72) Inventors: Mark Reimer, Denver, CO (US); Shy Ward, Flower Mound, TX (US); Neil Brown, Wayne, PA (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 18/063,789

(22) Filed: Dec. 9, 2022

(65) Prior Publication Data
US 2023/0196906 A1     Jun. 22, 2023

Related U.S. Application Data

(60) Provisional application No. 63/290,317, filed on Dec. 16, 2021.

(51) Int. Cl.
*G08B 29/16* (2006.01)
*G08B 21/18* (2006.01)

(52) U.S. Cl.
CPC ............ *G08B 29/16* (2013.01); *G08B 21/182* (2013.01)

(58) Field of Classification Search
CPC .................. G08B 29/16; G08B 21/182
See application file for complete search history.

(56) References Cited

U.S. PATENT DOCUMENTS

| 9,224,286 | B2 | 12/2015 | Shapiro et al. |
| 10,051,349 | B2 | 8/2018 | Schattmaier et al. |
| 10,522,031 | B2 | 12/2019 | Nalukurthy et al. |
| 10,607,478 | B1 | 3/2020 | Stewart et al. |
| 10,832,563 | B2 * | 11/2020 | Subramanian ........ G06F 3/0481 |
| 10,833,920 | B1 * | 11/2020 | Ramanadham ..... H04L 41/0661 |
| 2018/0373234 | A1 * | 12/2018 | Khalate ................. G06N 5/045 |
| 2021/0083926 | A1 * | 3/2021 | Costa .................. H04L 41/0686 |
| 2022/0365525 | A1 * | 11/2022 | Minisankar ............ G06N 20/00 |

FOREIGN PATENT DOCUMENTS

EP     3101636 A1     12/2016

* cited by examiner

*Primary Examiner* — Hongmin Fan
(74) *Attorney, Agent, or Firm* — Weisberg I.P. Law, P.A.

(57) ABSTRACT

Method, devices and systems are described. A diagnostics system for a premises monitoring system at a premises is provided. The diagnostic system includes processing circuitry configured to: receive premises system data associated with the premises monitoring system, perform supervised learning of a deep learning process based at least in part on the premises system data, and determine a classified set of resolutions based at least in part on the performed supervised learning where each resolution of the classified set of resolutions is associated with at least one premises event, and the at least one premises event relates to the premises monitoring system.

18 Claims, 7 Drawing Sheets

CUSTOMER EXPERIENCE DIAGNOSTICS IN PREMISES MONITORING SYSTEMS

CROSS-REFERENCE TO RELATED PATENT APPLICATION

This application is related to and claims priority to U.S. Provisional Patent Application Ser. No. 63/290,317, filed Dec. 16, 2021, entitled CUSTOMER EXPERIENCE DIAGNOSTICS IN PREMISES SECURITY AND AUTOMATION SYSTEM, the entirety of which is incorporated herein by reference.

TECHNICAL FIELD

This disclosure relates to methods and systems for customer experience diagnostics in a premises monitoring system.

BACKGROUND

Modern home security and automation systems typically include multiple wireless networks and support various devices, such as sensors, detectors, and actuators across a variety of user interfaces, such as web interfaces, mobile interfaces, touch interfaces, and voice interfaces. Further, modern home security and automation systems provide a set of capabilities that may include configurable rules, schedules, triggers, and scenes. When something in the home security and automation system does not work as expected (i.e., a problem or event associated with the home security or automation system arises), it can be challenging for a user of the home security and automation system to diagnose the problem, since advanced knowledge of information technology may be needed. Challenging diagnoses and advance knowledge requirements may lead to customer dissatisfaction and calls to customer support.

However, customer support may face the same challenges as the user. For example, even when customer support agents have received home security and automation systems training, it can take significant time to diagnose and/or fix a problem. Some experienced customer support agents can become proficient in analyzing the data, recognizing patterns, and resolving issues more efficiently than inexperienced agents. However, becoming experienced and proficient requires substantial training and on-the-job experience.

Some home security and automation software providers collect as much data as available and display the collected data to customer support agents in an effort to help the customer support agent diagnose the problem. However, displaying the collected data alone does not solve the problem, and still requires a highly experienced customer support agent to decipher the data.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Before describing in detail exemplary embodiments, it is noted that the embodiments may reside in combinations of apparatus components and processing steps related to customer experience diagnostics, e.g., associated with a premises monitoring system that includes security home security systems and/or home automation systems. Accordingly, the system and method components have been represented where appropriate by conventional symbols in the drawings, focusing only those specific details that facilitate understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a," "an" and "the" are intended to include the plural forms as well, unless the context clearly indicates otherwise. It will be further understood that the terms "comprises," "comprising," "includes," "including," "has," and "having," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

As used herein, "premises monitoring system" may refer to or include a premises security system and/or premises monitoring system.

Figure 1:
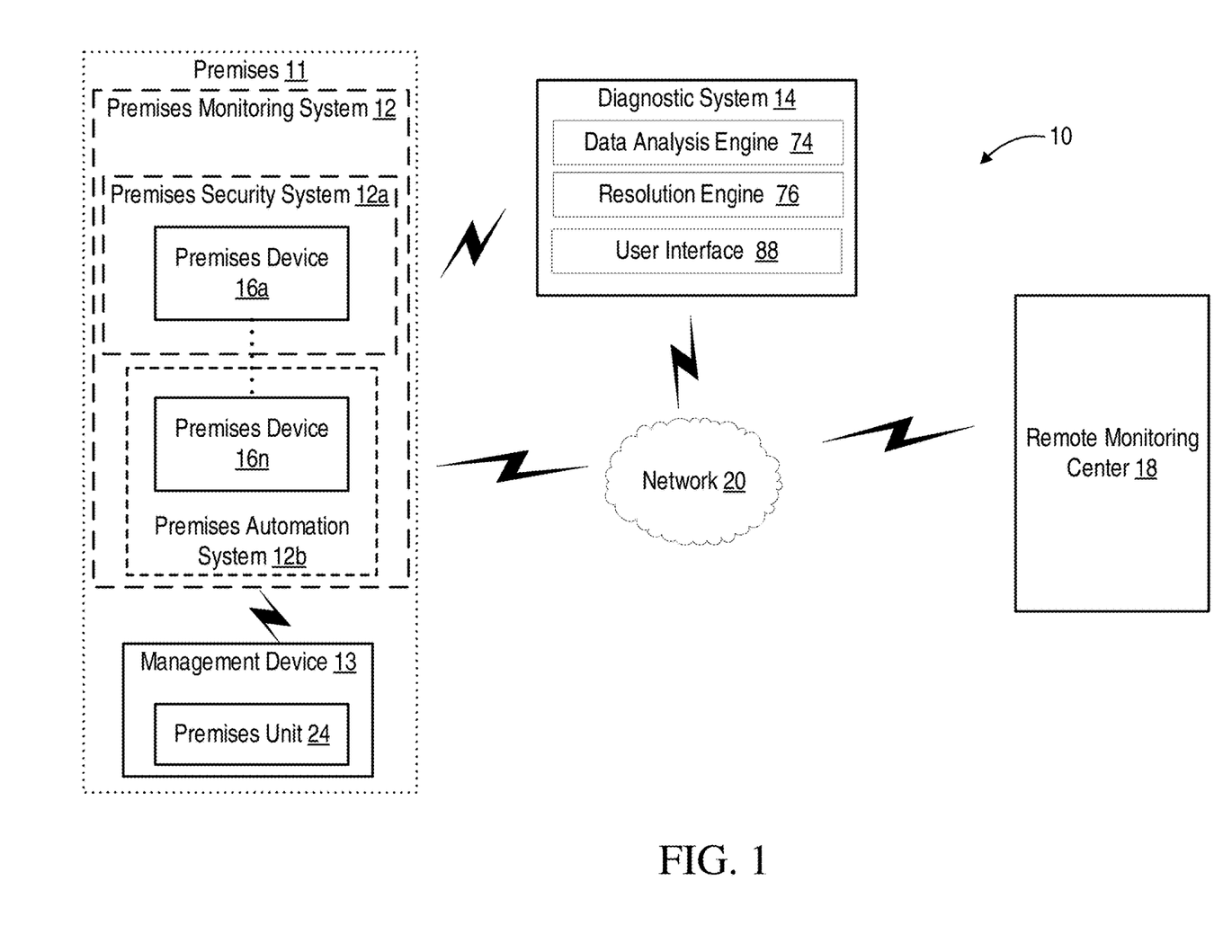
FIG. 1 is a diagram of an example system according to principles disclosed herein.

Referring to the drawing figures, in which like elements are referred to by like reference numerals, there is shown in FIG. 1 a diagram of an example system 10 comprising a premises monitoring system 12 including premises security system 12a and/or premises automation system 12b (collectively premises monitoring system 12) positioned at premises 11. System 10 further includes diagnostics system 14. Premises security system 12a and premises automation system 12b comprise one or more respective premises devices 16a and 16n (collectively referred to as premises device 16). System 10 includes management device 13 for controlling and/or managing premises monitoring system 12 (e.g., premises security system 12a and/or premises automation system 12b). For example, management device 13 comprises premises unit 24 that may be configured to perform various functionality associated with premises security system 12a, premises automation system 12b and/or any other device/component of system 10, e.g., collecting and/or processing and/or causing the premises security system 12a and/or premises automation system 12b to transmit premises system data. Although premises security system 12a and premises automation system 12b are shown as comprising respective security or automation premises devices 16a and 16n, premises security system 12a and premises automation system 12b are not limited to comprising only premises devices 16a and 16n and may include additional premises devices 16. Any premises device 16 can be in simultaneous communication and/or configured to separately communicate with more than one other premises device 16 and/or other premises security system 12a, diagnostic system 26, remote monitoring center 18, and/or other system 10. Although FIG. 1 shows the premises device 16 as included in the premises monitoring system 12 (i.e., premises security system 12a or premise automation system 12b), premises device 16 is not limited to being included in the premises security system 12a and/or system 10 and may reside standing alone, as part of another system, or in any other manner. System 12 may refer to any system, e.g., a premises security system, a premises automation system, a security and automation system such as a home security and automation system.

Further, each premises device 16 may include one or more sensors, detectors, control panels, control devices, images capture devices, life safety devices, lifestyle devices and other devices. For example, the types of sensors may include various life safety related sensors such as motion sensors, fire sensors, carbon monoxide sensors, flooding sensors and contact sensors, among other sensor types. The control devices may include, for example, one or more lifestyle (e.g., premises automation) related devices configured to adjust at least one premises setting such as lighting, temperature, energy usage, door lock and power settings, among other settings associated with the premises or devices on the premises. Image capture devices may include digital cameras and/or video cameras, among other image capture devices.

System 10 may also include a remote monitoring center 18, which may be capable of performing certain monitoring, configuration and/or control functions associated with system 10. For example, with respect to fire and carbon monoxide detectors, monitoring data may include information regarding carbon monoxide readings, smoke detection readings, sensor location and time of readings, among other information related to these detectors that may be communicated with remote monitoring center 18. In yet another example, with respect to a door contact detector, monitoring data may include sensor location and time of detection, among other data related to the door contact detection that may be communicated with remote monitoring center 18.

Premises system data, e.g., alarm event data from the premises devices 16, may be used by the remote monitoring center 18 for performing various safety response processes in notifying the owner of the premises, determining whether an alarm event is occurring at the premises, and notifying any appropriate response agency (e.g., police, fire, emergency response, other interested parties such as premises owners, etc.).

Further, system 10 may include diagnostic system 26, which may refer to a device configurable for direct and/or indirect communication with one or more of premises monitoring system 12, premises security system 12a, premises automation system 12b, remote monitoring center 18, or any other component of system 10. Diagnostic system 26 may refer to a customer experience diagnostics system, e.g., associated with a premises security system 12a and premises automation system 12b. Diagnostic system 26 may include at least one of data analysis engine 74, resolution engine 76, and/or user interface 88. Data analysis engine 74 may be configured at least to perform data analysis, e.g., analysis of premise system data used for supervised learning of a deep learning process/algorithm such as to train resolution engine 76. Resolution engine 76 may be configured to determine at least one resolution, e.g., output at least one classified resolution. User interface 88 may be configured to provide an interface at least to a user, e.g., provide a display of a score of a customer experience associated with a recommended resolution.

Although diagnostic system 26 is shown as a standalone system, diagnostic system 26 is not limited to being standalone and may be part of any component of system 10, e.g., premises unit 24, premises security system 12a, premises automation system 12b, remote monitoring center 18, etc. For example, diagnostic system 26 may be part of remote monitoring center 18 such that a customer support agent at remote monitoring center 18 may interact with diagnostic system 26 via user interface 88. In another example, diagnostic system 26 may be part of premises security system 12a or premises automation system 12b such that a user (e.g., home occupant) is able to interact with diagnostic system 26 via user interface 88. Further, one or more of premises security system 12a and premises automation system 12b, remote monitoring center 18 may be configured to have the same or similar components, e.g., hardware and/or software, as those described for diagnostics system 26.

Further, system 10 may include network 20 (which may refer to a plurality of networks), which may be configured to provide direct/indirect communication, e.g., wired and/or wireless communication, between any two or more components of system 10, e.g., premises security system 12a, premises device 16, premises unit 24, remote monitoring center 18, diagnostics system 26, etc. In a non-limiting example, premises device 16 of premises security system 12a or premises device 16 of premises automation system 12b may communicate with the remote monitoring center 18 and/or diagnostic system 26 via network 20, e.g., to provide premises system data associated with premises security system 12a and/or premises automation system 12b. Although network 20 is shown as an intermediate network between components/devices of system 10, any component/device may communicate directly with any other component/device of system 10. In a non-limiting example, diagnostic system 26 may communicate directly with premises security system 12a, premises automation system 12b, premises device 16, and/or remote monitoring center 18.

Note further that functions described herein as being performed by a diagnostics system 26 may be distributed over a plurality of diagnostics systems 26. In other words, the functions of the diagnostics system 26 described herein are not limited to performance by a single physical device and, in fact, can be distributed among several physical devices. Similarly, functions described herein as being performed by a one or more of premises security system 12a, premises automation system 12b, and remote monitoring center 18 may be distributed over a devices and/or systems, respectively.

Figure 2:
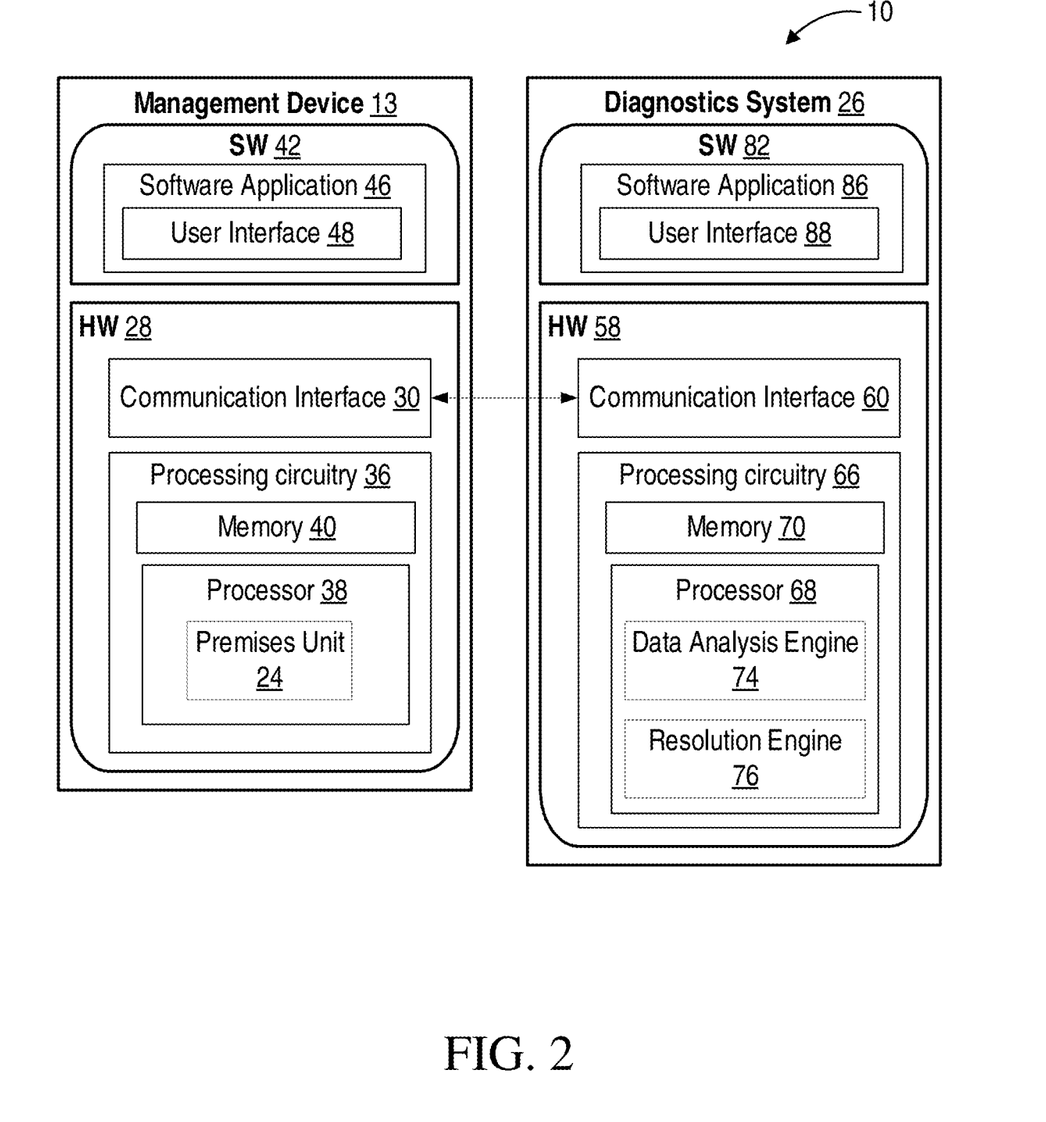
FIG. 2 is a block diagram of some devices in the system according to some embodiments of the present disclosure.

Example implementations, in accordance with embodiments of system 10 discussed in the preceding paragraphs will now be described with reference to FIG. 2.

The management device 13 includes hardware 28. The hardware 28 may include processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors and/or processor cores and/or field programmable gate arrays (FPGAs) and/or application specific integrated circuits (ASICs) adapted to execute instructions. The processor 38 may be configured to access (e.g., write to and/or read from) the memory 40, which may comprise any kind of volatile and/or nonvolatile memory, e.g., cache and/or buffer memory and/or random access memory (RAM) and/or read-only memory (ROM) and/or optical memory and/or erasable programmable read-only memory (EPROM). Further, memory 40 may be configured as a storage device.

Hardware 28 of premises management device 13 may include communication interface 30 enabling it to communicate with any component or device of system 10. For example, communication interface 30 may be configured for establishing and maintaining at least a wireless or wired connection with any component or device of system 10, such as diagnostics system 26, premises device 16, etc. The communication interface 30 may be formed as or may include, for example, one or more radio frequency (RF) transmitters, one or more RF receivers, and/or one or more RF transceivers.

Management device 13 further has software 42 (which may include software application 46 and/or user interface 48) stored internally in, for example, memory 40, or stored in external memory (e.g., database, storage array, network storage device, etc.) accessible by the management device 13 via an external connection. Software application 46 may include any software or program configured to perform the steps or processes of the present disclosure, e.g., providing an interface for a user (e.g., user interface 48) to provide an input to the management device 13 and/or receive an output from the management device 13. Further, software application 46 may run and/or be included directly as part of software 42 and/or management device 13. Software application 46 may be virtualized and/or running outside management device 13 and/or any of the components of management device 13.

The processing circuitry 36 may be configured to control any of methods and/or processes described herein and/or to cause such methods, and/or processes to be performed, e.g., by management device 13. Processor 38 corresponds to one or more processors 38 for performing management device 13 functions described herein. The memory 40 is configured to store data and/or files such as premises system data and/or other information/data described herein. In some embodiments, the software 42 may include instructions that, when executed by the processor 38 and/or processing circuitry 36, causes the processor 38 and/or processing circuitry 36 to perform the processes described herein with respect to management device 13. For example, processing circuitry 36 of the management device 13 may include premises unit 24, which may be configured to perform any of the processes, steps, or functions described herein, e.g., collect and/or process and/or cause management device 13 to transmit premises system data, such as premises system data received from premises security system 12a and premise automation system 12b.

The system 10 further includes diagnostics system 26 including hardware 58. The hardware 58 may include processing circuitry 66. The processing circuitry 66 may include a processor 68 and a memory 70. In particular, in addition to or instead of a processor, such as a central processing unit, and memory, the processing circuitry 66 may comprise integrated circuitry for processing and/or control, e.g., one or more processors and/or processor cores and/or field programmable gate arrays (FPGAs) and/or application specific integrated circuits (ASICs) adapted to execute instructions. The processor 68 may be configured to access (e.g., write to and/or read from) the memory 70, which may comprise any kind of volatile and/or nonvolatile memory, e.g., cache and/or buffer memory and/or random access memory (RAM) and/or read-only memory (ROM) and/or optical memory and/or erasable programmable read-only memory (EPROM). Further, memory 70 may be configured as a storage device.

Hardware 58 of diagnostics system 26 may include communication interface 60 enabling it to communicate with any component or device of system 10. For example, communication interface 60 may be configured for setting up and maintaining at least a wireless or wired connection with any component or device of system 10, such as premises security system 12a, premises automation system 12b, remote monitoring center 18, etc. The communication interface 60 may be formed as or may include, for example, one or more RF transmitters, one or more RF receivers, and/or one or more RF transceivers.

Diagnostics system 26 further has software 82 (which may include software application 86 and/or include user interface 88) stored internally in, for example, memory 70, or stored in external memory (e.g., database, storage array, network storage device, etc.) accessible by the diagnostics system 26 via an external connection. Software application 86 may include any software or program configured to perform the steps/processes of the present disclosure, e.g., providing an interface for a user to provide an input to the diagnostics system 26 and/or receive an output from the diagnostics system 26. Further, software application 86 may run and/or be included directly as part of software 82 and/or diagnostics system 26. Software application 86 may be virtualized and/or running outside diagnostics system 26 and/or any of the components of diagnostics system 26.

The processing circuitry 66 may be configured to control any of methods and/or processes described herein and/or to cause such methods, and/or processes to be performed, e.g., by diagnostics system 26. Processor 68 corresponds to one or more processors 38 for performing diagnostics system 26 functions described herein. The memory 70 is configured to store data and/or files, e.g., data or information generated by data analysis engine 74, resolution engine 76, and/or user interface 88 and/or other information described herein. In some embodiments, the software 72 may include instructions that, when executed by the processor 68 and/or processing circuitry 66, causes the processor 68 and/or processing circuitry 66 to perform the processes described herein with respect to diagnostics system 26. For example, processing circuitry 66 of the diagnostics system 26 may include data analysis engine 74, resolution engine 76, and/or user interface 88. Data analysis engine 74 may be configured at least perform any data analysis, e.g., analysis of data used for supervised learning of a deep learning process or algorithm such as to train resolution engine 76. Resolution engine 76 may be configured to determine at least one resolution, e.g., output at least one classified resolution. User interface 88 may be configured to provide an interface at least to a user, e.g., provide a display of a score of a customer experience associated with a recommended resolution.

Figure 3:
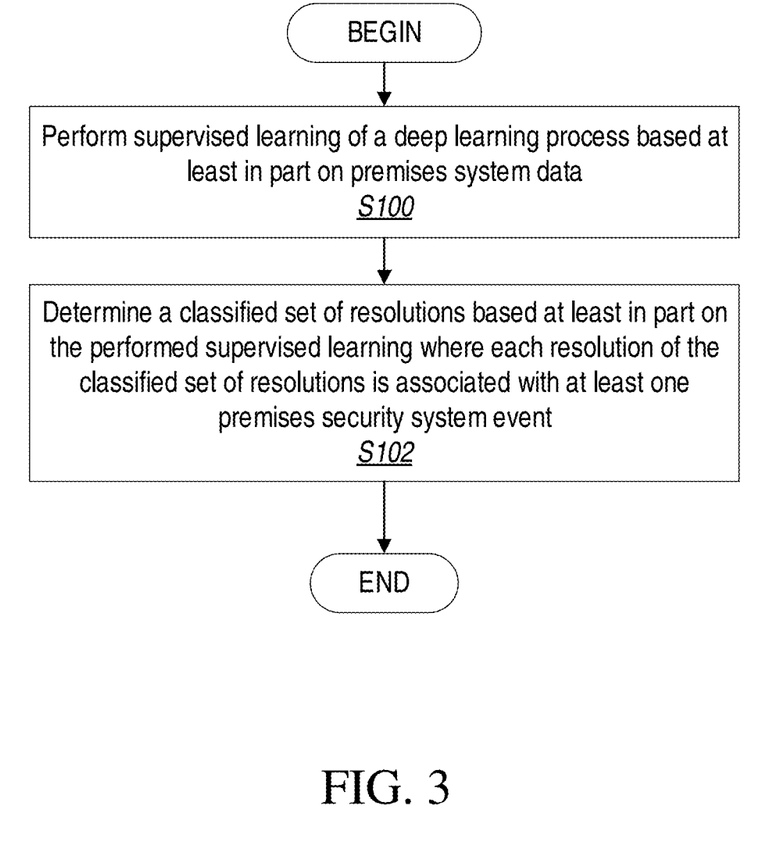
FIG. 3 is a flowchart of an example process in a diagnostics system according to some embodiments of the present disclosure.

FIG. 3 is a flowchart of an example process in diagnostics system 26 according to some embodiments of the present disclosure. One or more blocks described herein may be performed by one or more elements of diagnostics system 26, such as by one or more of processing circuitry 66 (including the data analysis engine 74, resolution engine 76, and/or user interface 88) and/or processor 68 and/or communication interface 60. Diagnostics system 26 is configured to perform (Block S100) supervised learning of a deep learning process based at least in part on premises system data, as described herein. Diagnostics system 26 is configured to determine (Block S102) a classified set of resolutions based at least in part on the performed supervised learning where each resolution of the classified set of resolutions is associated with at least one premises security system event, as described herein.

In some embodiments, the process further includes receiving, such as via communication interface 60, the premises system data where the premises system data includes any one of time series data, system-level data, user analytics, and customer support information. The customer support information includes at least resolution code data.

In some other embodiments, each resolution of the determined classified set of resolutions is associated with a confidence score.

In an embodiment, the process further includes determining, such as via processing circuitry 66, a corrective action associated with at least one resolution of the determined classified set of resolutions when the confidence score corresponding to the at least one resolution is greater than a first predetermined threshold. The corrective action is determined to correct the at least one premises security system event.

In another embodiment, the deep learning process uses convolution and pooling layers associated with the premises system data.

In some embodiments, a customer experience score is determined based at least in part on the determined classified set of resolutions; and the determined customer experience score is displayed on a user interface 88, when a second predetermined threshold is exceeded. The user interface 88 is configurable at least to one of show and hide premises system data.

In some other embodiments, the at least one premises security system event is associated with a customer experience of a user of a premises security system 12a, the premises automation system 12b or a premises security and automation system 12a,b.

Figure 4:
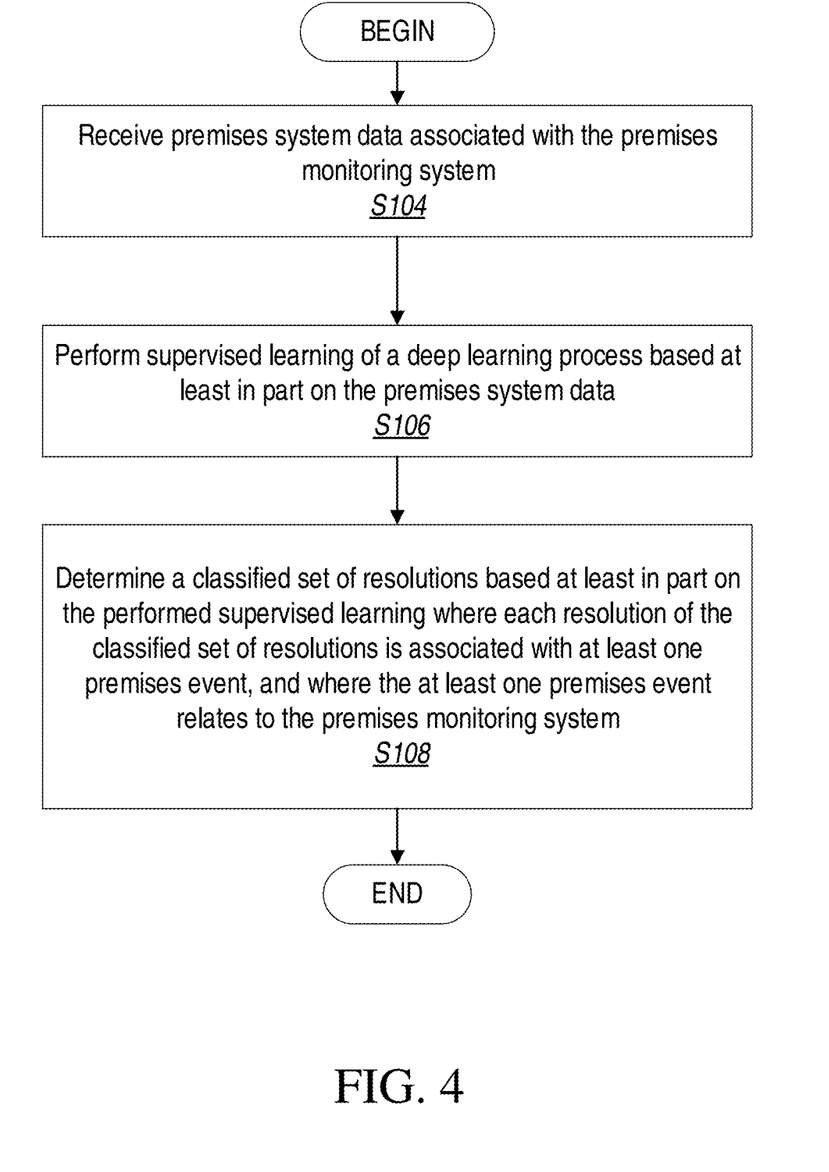
FIG. 4 is a flowchart of another example process in a diagnostics system according to some embodiments of the present disclosure.

FIG. 4 is a flowchart of another example process in diagnostics system 26 according to some embodiments of the present disclosure. One or more blocks described herein may be performed by one or more elements of diagnostics system 26 such as by one or more of processing circuitry 66 (including the data analysis engine 74, resolution engine 76, and/or user interface 88) and/or processor 68 and/or communication interface 60. Diagnostics system 26 is configured to receive (Block S104) premises system data associated with the premises monitoring system 12, as described herein. Diagnostics system 26 is configured to perform (Block S106) supervised learning of a deep learning process based at least in part on the premises system data, as described herein. Diagnostics system 26 is configured to determine (Block S108) a classified set of resolutions based at least in part on the performed supervised learning where each resolution of the classified set of resolutions is associated with at least one premises event, and where the at least one premises event relates to the premises monitoring system 12, as described herein.

In one or more embodiments, the premises system data comprises at least one of time series data, system-level data or user analytics. In one or more embodiments, the premises system data comprises customer support information, the customer support information comprising at least resolution code data. In one or more embodiments, each resolution of the determined classified set of resolutions is associated with a confidence score.

In one or more embodiments, the processing circuitry 66 is further configured to: initiate, without instruction from a user, a corrective action associated with at least one resolution of the determined classified set of resolutions where the corrective action is configured to modify a configuration of the premises monitoring system 12. In one or more embodiments, the corrective action is a corrective action based on a confidence score of the at least one resolution being greater than a predetermined threshold. In one or more embodiments, the deep learning process uses convolution and pooling layers to analyze the premises system data for determining the classified set of resolutions.

In one or more embodiments, the processing circuitry 66 is further configured to: determine a customer experience score based at least in part on the determined classified set of resolutions, and display the determined customer experience score on a user interface when a predetermined threshold is exceeded where the user interface is configurable display the premises system data. In one or more embodiments, the at least one premises event is associated with a customer experience of a user of the premises monitoring system 12. In one or more embodiments, the at least one premises event is associated with at least one of a security alarm event, sensor event, camera event, connectivity event, connection performance, system latency, premises automation, video quality, heating ventilation, or air conditioning (HVAC).

Having described the general process flow of arrangements of the disclosure and having provided examples of hardware and software arrangements for implementing the processes and functions of the present disclosure, the sections below provide details and examples of arrangements for performing/determining diagnostics, e.g., customer experiences diagnostics, for a premise security system 12a and/or premises automation system 12b.

Premises monitoring system 12 (i.e., premises security system 12a and/or premises automation system 12b), may determine, process, provide, and/or transmit premises system data, e.g., timeseries data corresponding to device states. Premises system data may include any of system-level data (e.g., captured system-level data related to RF performance, noise, battery levels), and user analytics such as the actions a consumer has taken through the user interface 48 (e.g., login actions, arming/disarming premises security system 12a, changing a thermostat set-point of premise automation system 12b, etc.). In one or more embodiments premises system data may include national, regional, etc., historical data for the one or more premises device 16. Customer care, e.g., remote monitoring center 18, collects premises system data, e.g., information related to customer support calls including problem and resolution information. In another embodiment, premises system data may include data associated with any component of system 10. In a nonlimiting example, premises system data may be data associated with customer's use of any component of system 10 and/or timeseries data collected by the any component of system 10 such as premises security system 12a, premises automation system 12b, and premises devices 16 such as sensors, detectors, actuators, etc. Further, premises system data may include data or metadata associated to one or more calls (e.g., customer calls to customer service) about any components of system 10, such as calls about problems with system 10. Premises data may be stored in a persistent data repository (e.g., memory 40, memory 70, etc.). Metadata associated with the one or more calls (e.g., information representing the reason why the customer was calling, issue categorization, one or more resolution codes which addressed the problem with the system) may be determined and/or stored in the persistent data repository (e.g., memory 40, memory 70, etc.). In addition, premises system data may be joined by a unique customer identifier and/or a time stamp window.

In some embodiments, premises system data may be used, e.g., by data analysis engine 74 in diagnostics system 26, for supervised learning of a deep learning process or algorithm, such as to train resolution engine 76, where one or more customer care resolution codes may serve as the labeled training data. The output of the training process may be a classified set of resolutions, e.g., to customer experience issues, based on input data. To further assist in the supervised learning, premises system data including customer feedback data may be used, e.g., in the form of a survey following a customer support call. The survey could be arranged to ask a customer or user to rate whether a premises event, such as a premises security system 12a event, e.g., a problem, has been fixed or corrected. The customer feedback data may be included in training data to provide weighting to labeled training data set(s).

Resolution engine 76 may be a trained model, e.g., trained by data analysis engine 74. The trained model may output classified resolutions with corresponding confidence scores, e.g., probability scores. A confidence score may be a probability that a classified resolution will solve a problem (e.g., an issue of any component of system 10, which may have been reported by a customer). For resolutions having a predetermined confidence score, diagnostic system 26 could take one or more actions and/or cause other components of system 10 (e.g., premises security system 12a, premises automation system 12b, remote monitoring center 18, etc.) to automatically address problems associated with system 10 (e.g., by automatically taking a corrective action such as an action to correct a premises event such as a premises security system event) such as before a customer calls customer support (e.g., remote monitoring center 18). That is, the diagnostics system 26 may automatically take a corrective action, such as an action that causes a change or modification of a configuration of at least one component of system 10, e.g., premises device 16, when a confidence score is greater than a threshold. The change or modification that is made may be in accordance with the resolution.

Figure 7:
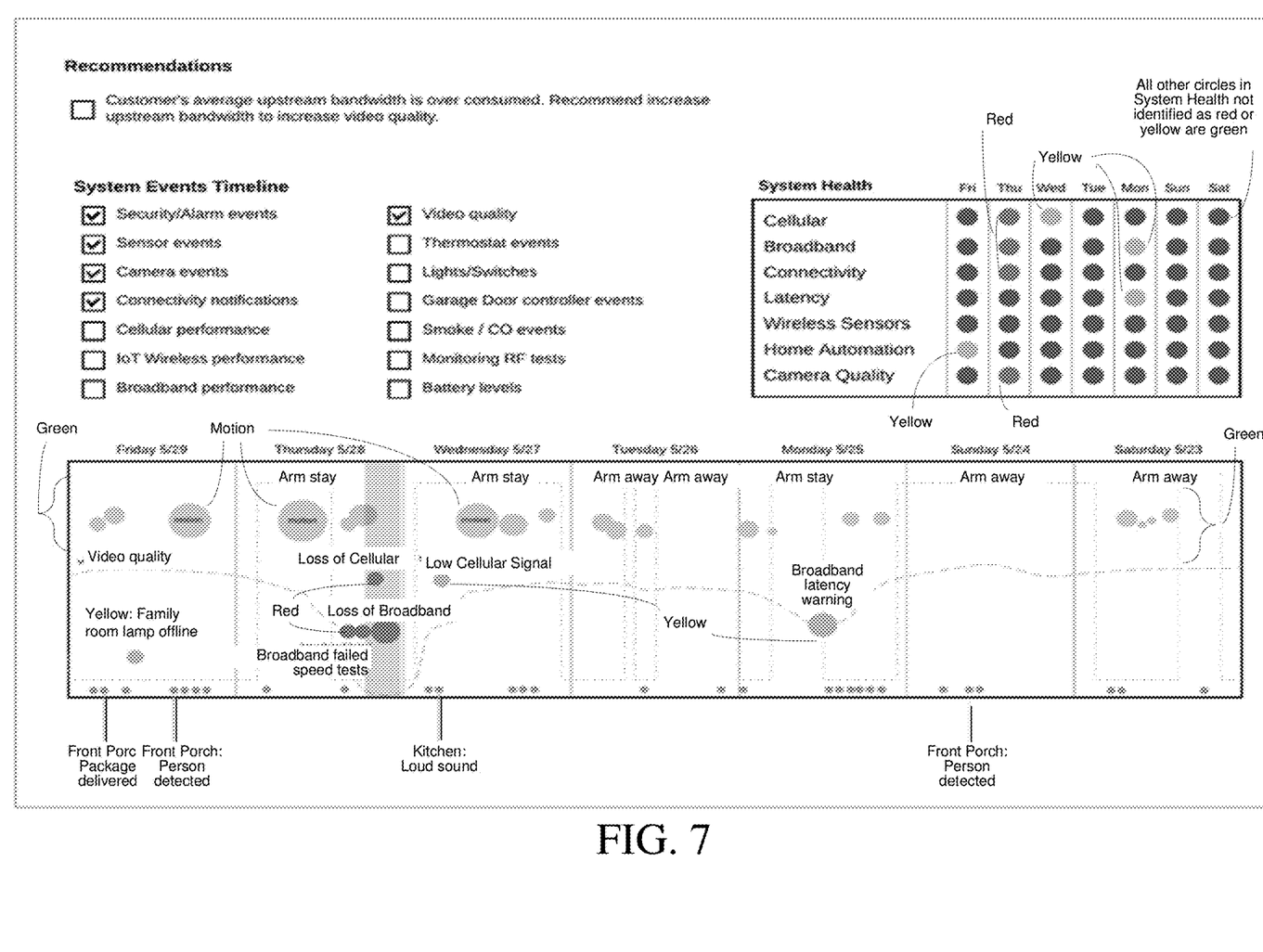
FIG. 7 shows an example user interface according to some embodiments of the present disclosure.

In a nonlimiting example, loss of connectivity of a premises device 16 may be remedied by the diagnostic system 26 (based on a process performed by data analysis engine 74, resolution engine 76, etc.) that causes communication interface 30 of management device 13 to reset and/or switch communication protocols, etc., thereby re-establishing connectivity between premises device 16 and management device 13. In another nonlimiting example, when premises system data indicates that a cellular signal used by the management device 13 of premises security system 12a and premise automation system 12b is lower than a predetermined threshold (i.e., low cellular signal as shown in FIG. 7), the diagnostics system 26 may automatically take a corrective action that changes the configuration of the management device 13. The change in configuration may cause communication interface 30 to reset a communication protocol link used by communication interface 30 to communicate using a cellular protocol and/or switch to another protocol, e.g., a protocol used in broadband communication. In another nonlimiting example, an automatic corrective action may include resetting a premises device 16, e.g., a sensor for which increasing sensor sensitivity has not corrected a corresponding premises security system event. Automatic corrective actions are not limited to the examples described and may include any action associated with any component of system 10, e.g., actions associated with security/alarm events, sensor events, camera events, connectivity events/notifications, connection performance, system latency, premises automation, video quality, heating ventilation and air conditioning (HVAC) controls such as thermostats, lighting controls, door controls, battery levels, etc.)

User Interface 88 may provide a low complexity display of a score (e.g., current, historical) of a premises system event, e.g., a customer experience, and/or recommended resolutions and/or confidence scores (e.g., for one or more resolutions that are greater than, equal to, and/or less than a configurable threshold (i.e., a predeterminable threshold). User interface 88 may be configurable to show or hide different types of data such as to offer a configurable view to users, e.g., a customer support agent.

Figure 5:
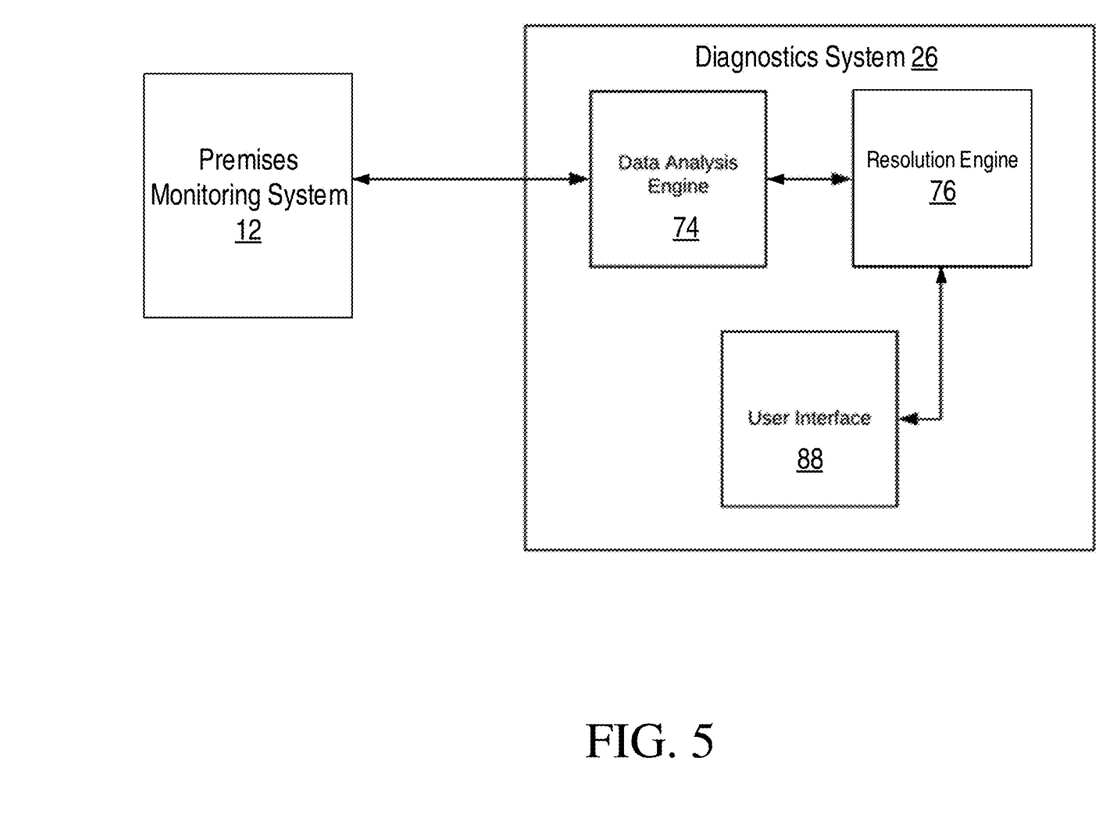
FIG. 5 is a block diagram of a diagnostics system according to some embodiments of the present disclosure.

FIG. 5 is a block diagram of a diagnostics system 26 in communication with premises security and premises automation system 12a,b according to some embodiments of the present disclosure. Premises security and premises automation system 12a,b may directly or indirectly communicate with data analysis engine 74, e.g., to provide premises system data. Resolution engine 76 may communicate with data analysis engine 74 where that data analysis engine is trained and the resolution engine 76 may be subsequently trained by data analysis engine 74, and with user interface 88, e.g., to output classified resolutions. The user interface 88 may then display scores of customer experience, recommended resolutions, and/or confidence scores. Although data analysis engine 74, resolution engine 76, and user interface 88 are shown as being part of diagnostic system 26 data analysis engine 74, any one of resolution engine 76, and user interface 88 may be stand alone and reside outside diagnostics system 26.

Figure 6:
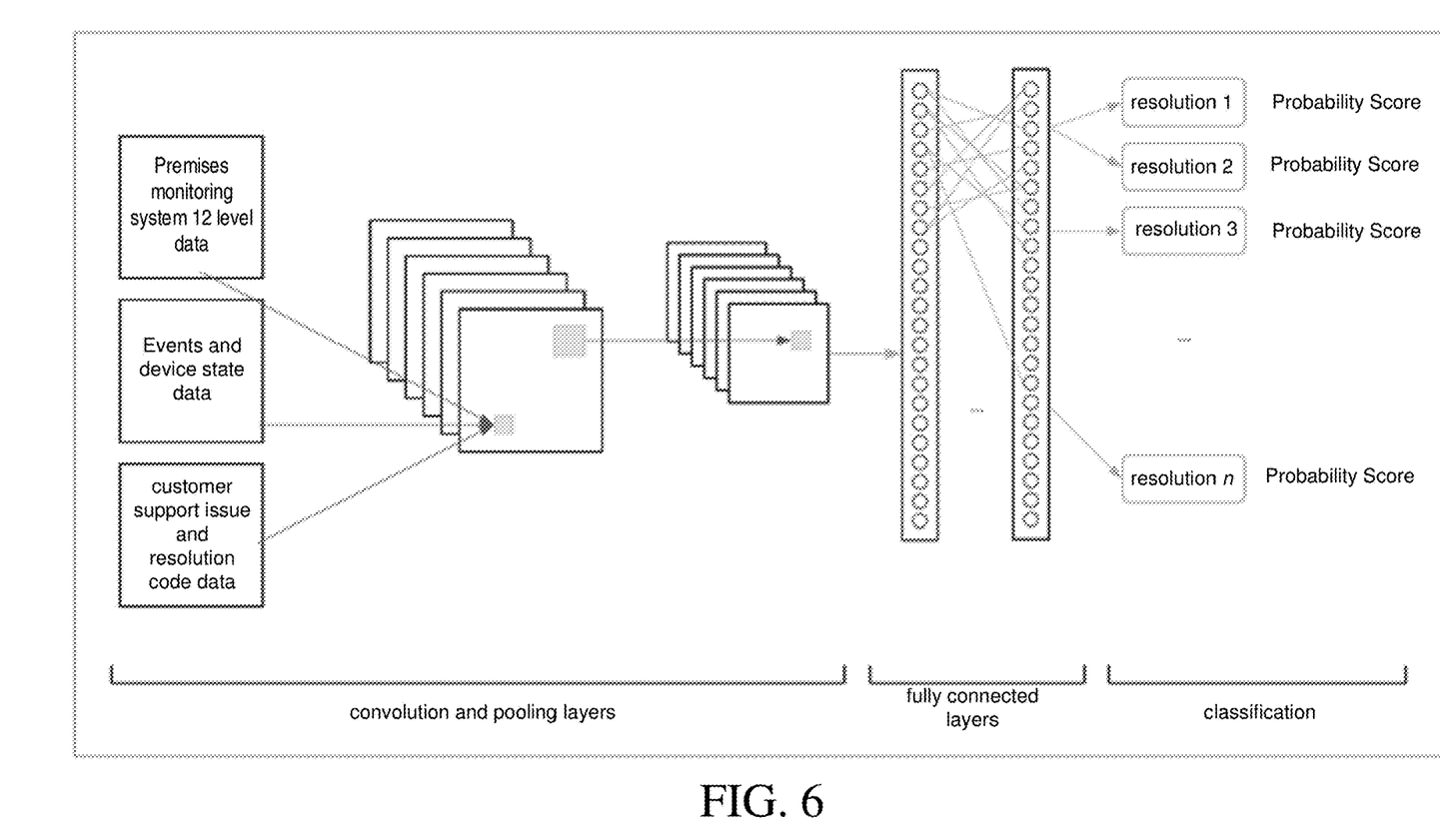
FIG. 6 shows an example deep learning process according to some embodiments of the present disclosure.

FIG. 6 shows an example deep learning process according to some embodiments of the present disclosure. Deep learning and/or machine learning may be used to for anomaly detection (e.g., detecting an issue associated with premises security system 12a and/or premises automation system 12b). A nonlimiting approach suited to time-series data may be a Long Short-Term Memory (LSTM) recurrent neural network such as an LSTM model. The LSTM model may use an encoder to read an input sequence and a decoder for reading the input sequence and/or outputting a predicted sequence. The LSTM model may wait for (i.e., receive) an actual value in the time series data and/or checks (e.g., determine) if the actual value is within a predetermined threshold of a predicted value. If the actual value is not within the predetermined threshold, then it (e.g., the actual value) is an anomaly. A layer such as an LSTM layer may be created, e.g., using a Python (programming language) library such as Keras on TensorFlow.

The deep learning process shown in FIG. 6 may include or use convolution and pooling layers, where premises system data (e.g., premises security and premises automation system-level data, events and device state data, customer support issue and resolution code data) are used in a first layer, an output of the first layer is used by a second layer. The output of the second layer is used by fully connected layers, and resolutions 1-n, each associated with a score, e.g., probability score, confidence score, etc., are determined, e.g., in a classification phase. Hence, one or more resolutions to remedy one or more issues with premises security system 12a and/or premises automation system 12b are determined and then displayed for a user to view where the resolutions are associated with confidence scores.

FIG. 7 shows an example user interface 48, 88 according to some embodiments of the present disclosure. The user interface 48, 88 may refer to a customer care user interface and may include system health indications for certain time periods, e.g., days of the week, month, year. The customer care interface may further include premises security system event(s), which may be selectable, e.g., security/alarm events, sensor events, camera events, etc. A graph may be configured to show events throughout time periods and system health indications where these events are used by diagnostic system 26 to determine a recommended course of action (e.g., recommend increasing upstream bandwidth to increase video quality) to help remedy the one or more events (e.g., broadband latency warning, failed speed test, etc.) indicated in the user interface 48, 88.

As will be appreciated by one of skill in the art, the concepts described herein may be embodied as methods, systems, computer program products and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A diagnostics system for a premises monitoring system at a premises, the diagnostic system comprising:
processing circuitry configured to:
receive premises system data associated with the premises monitoring system, the premises system data comprising customer support information, the customer support information comprising at least resolution code data;
perform supervised learning of a deep learning process based at least in part on the premises system data; and
determine a classified set of resolutions based at least in part on the performed supervised learning, each resolution of the classified set of resolutions being associated with at least one premises event, the at least one premises event relating the premises monitoring system.

2. The diagnostics system of claim 1, wherein the premises system data comprises at least one of time series data, system-level data or user analytics.

3. The diagnostics system of claim 1, wherein each resolution of the determined classified set of resolutions is associated with a confidence score.

4. The diagnostics system of claim 1, wherein the processing circuitry is further configured to:
initiate, without instruction from a user, a corrective action associated with at least one resolution of the determined classified set of resolutions, the corrective action configured to modify a configuration of one of the premises monitoring system.

5. The diagnostics system of claim 4, wherein the corrective action is a corrective action based on a confidence score of the at least one resolution being greater than a predetermined threshold.

6. The diagnostics system of claim 1, wherein the deep learning process uses convolution and pooling layers to analyze the premises system data for determining the classified set of resolutions.

7. The diagnostics system of claim 1, wherein the processing circuitry is further configured to:
determine a customer experience score based at least in part on the determined classified set of resolutions; and
display the determined customer experience score on a user interface when a predetermined threshold is exceeded, the user interface being configurable display the premises system data.

8. The diagnostics system of claim 1, wherein the at least one premises event is associated with a customer experience of a user of the premises monitoring system.

9. The diagnostics system of claim 1, wherein the at least one premises event is associated with at least one of a security alarm event, sensor event, camera event, connectivity event, connection performance, system latency, premises automation, video quality, heating ventilation, or air conditioning (HVAC).

10. A method implemented by a diagnostics system for a premises monitoring system at a premises, the method comprising:
receiving premises system data associated with the premises monitoring system, the premises system data comprising customer support information, the customer support information comprising at least resolution code data;
performing supervised learning of a deep learning process based at least in part on the premises system data; and
determining a classified set of resolutions based at least in part on the performed supervised learning, each resolution of the classified set of resolutions being associated with at least one premises event, the at least one premises event relating to the premises monitoring system.

11. The method of claim 10, wherein the premises system data comprises at least one of time series data, system-level data or user analytics.

12. The method of claim 10, wherein each resolution of the determined classified set of resolutions is associated with a confidence score.

13. The method of claim 10, further comprising:
initiating, without instruction from a user, a corrective action associated with at least one resolution of the determined classified set of resolutions, the corrective action configured to modify a configuration of the premises monitoring system.

14. The method of claim 13, wherein the corrective action is a corrective action based on a confidence score of the at least one resolution being greater than a predetermined threshold.

15. The method of claim 10, wherein the deep learning process uses convolution and pooling layers to analyze the premises system data for determining the classified set of resolutions.

16. The method of claim 10, further comprising:
determining a customer experience score based at least in part on the determined classified set of resolutions; and
displaying the determined customer experience score on a user interface when a predetermined threshold is exceeded, the user interface being configurable display the premises system data.

17. The method of claim 10, wherein the at least one premises event is associated with a customer experience of a user of the premises monitoring system.

18. The method of claim 10, wherein the at least one premises event is associated with at least one of a security/alarm event, sensor event, camera event, connectivity event, connection performance, system latency, premises automation, video quality, heating ventilation, or air conditioning (HVAC).

* * * * *